(12) United States Patent
Huang et al.

(10) Patent No.: US 11,367,457 B2
(45) Date of Patent: Jun. 21, 2022

(54) METHOD FOR DETECTING AMBIENT NOISE TO CHANGE THE PLAYING VOICE FREQUENCY AND SOUND PLAYING DEVICE THEREOF

(71) Applicant: PixArt Imaging Inc., Hsin-Chu County (TW)

(72) Inventors: Yu-Chieh Huang, Taipei (TW); Kuan-Li Chao, Taipei (TW); Neo Bob Chih-Yung Young, Taipei (TW); Kuo-Ping Yang, Taipei (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 16/274,286

(22) Filed: Feb. 13, 2019

(65) Prior Publication Data
US 2019/0362734 A1    Nov. 28, 2019

(30) Foreign Application Priority Data

May 28, 2018    (TW) .................................. 107118170

(51) Int. Cl.
*G10L 21/0232*    (2013.01)
*G10L 15/02*    (2006.01)
(Continued)

(52) U.S. Cl.
CPC .......... *G10L 21/0232* (2013.01); *G10L 15/02* (2013.01); *H04R 3/04* (2013.01); *G10L 2015/025* (2013.01); *H04R 1/1083* (2013.01); *H04R 1/22* (2013.01); *H04R 1/32* (2013.01); *H04R 3/002* (2013.01); *H04R 3/005* (2013.01); *H04R 5/04* (2013.01); *H04R 25/554* (2013.01)

(58) Field of Classification Search
CPC .......... H04R 1/1083; H04R 1/22; H04R 1/32; H04R 3/002; H04R 3/005; H04R 5/04; H04R 25/554; G10L 21/0232; G10L 15/02; G10L 2015/025
See application file for complete search history.

(56) References Cited

U.S. PATENT DOCUMENTS 4,843,623 A * 6/1989 Lafon .................. H04R 25/353
   381/316
5,014,319 A * 5/1991 Leibman .............. H04R 25/353
   381/316

(Continued)

FOREIGN PATENT DOCUMENTS

JP         H1115495 A   *  1/1999
JP         2004347653 A *  12/2004
WO         WO-0075920 A1 * 12/2000 ........... H04R 25/505

*Primary Examiner* — Matthew A Eason
*Assistant Examiner* — Kuassi A Ganmavo
(74) *Attorney, Agent, or Firm* — Bacon & Thomas, PLLC

(57) ABSTRACT

A method for detecting ambient noise to change the playing voice frequency and a sound playing device thereof are disclosed. The method includes the following steps: obtaining an input voice; detecting an ambient noise, and analyzing a noise frequency range of the ambient noise; determining whether a consonant frequency range of the input voice falls within the noise frequency range; if yes, adjusting the frequency of the consonant of the input voice to avoid the noise frequency range to form a modified voice; and playing an output voice, wherein the output voice includes the modified voice.

8 Claims, 4 Drawing Sheets

(51) Int. Cl.
  *H04R 3/04*   (2006.01)
  *H04R 1/10*   (2006.01)
  *H04R 3/00*   (2006.01)
  *H04R 1/32*   (2006.01)
  *H04R 1/22*   (2006.01)
  *H04R 5/04*   (2006.01)
  *H04R 25/00*  (2006.01)

(56) References Cited

U.S. PATENT DOCUMENTS

| | | | | |
|---|---|---|---|---|
| 5,752,226 A * | 5/1998 | Chan | G10L 21/0208 | 704/233 |
| 6,285,979 B1 * | 9/2001 | Ginzburg | G10L 25/93 | 704/208 |
| 8,031,892 B2 * | 10/2011 | Andersen | H04R 25/353 | 381/312 |
| 2006/0241938 A1 * | 10/2006 | Hetherington | G10L 21/02 | 704/208 |
| 2006/0247922 A1 * | 11/2006 | Hetherington | G10L 21/02 | 704/208 |
| 2007/0174050 A1 * | 7/2007 | Li | G10L 21/0364 | 704/208 |
| 2009/0226015 A1 * | 9/2009 | Zeng | H04R 25/353 | 607/57 |
| 2012/0076331 A1 * | 3/2012 | Giese | H04R 25/356 | 381/312 |
| 2012/0197643 A1 * | 8/2012 | Talwar | G10L 15/20 | 704/249 |
| 2013/0073283 A1 * | 3/2013 | Yamabe | G10L 21/0216 | 704/226 |
| 2013/0182875 A1 * | 7/2013 | Cederberg | G10L 25/93 | 381/317 |
| 2014/0177853 A1 * | 6/2014 | Toyama | G10L 21/0208 | 381/58 |
| 2015/0163600 A1 * | 6/2015 | Liaw | H04R 25/353 | 381/320 |
| 2016/0189707 A1 * | 6/2016 | Donjon | H04W 88/02 | 704/205 |
| 2016/0205482 A1 * | 7/2016 | Raether | H04R 25/558 | 381/314 |

* cited by examiner

METHOD FOR DETECTING AMBIENT NOISE TO CHANGE THE PLAYING VOICE FREQUENCY AND SOUND PLAYING DEVICE THEREOF

BACKGROUND OF THE INVENTION

1. Field of the Invention

The present invention relates to a method for detecting ambient noise to change the playing voice frequency and a sound playing device thereof, particularly to a method for detecting ambient noise to change the playing voice frequency and a sound playing device thereof, which can avoid the impact of ambient noise.

2. Description of the Related Art

It is now a common technique for users to listen to sounds using devices such as audio equipment, portable audio player, or smart phone. The users are not only listening to music, but also listening to simple voice signals. However, when listening to voice signals, the signals may be disturbed by external sounds. For example, when using satellite navigation while driving, the navigation voice signal may be disturbed by the continuous noise generated in the car. In the prior art, the best way is to shield all external noise, but in this way the cost is too high. Further, if a speaker is used to listen to the sound, the shielding of external noise cannot be achieved, and the voice signal cannot be heard.

Accordingly, it is necessary to devise a new a method for detecting ambient noise to change the playing voice frequency and a sound playing device thereof to solve the problem in the prior art.

SUMMARY OF THE INVENTION

It is a major objective of the present invention to provide a method for detecting ambient noise to change the playing voice frequency, which can avoid the influence of ambient noise.

It is another major objective of the present invention to provide a sound playing device used in the above method.

To achieve the above objects, a method for detecting ambient noise to change the playing voice frequency in the present invention is used in the sound playing device. The method includes the following steps: obtaining an input voice; detecting an ambient noise, and analyzing a noise frequency range of the ambient noise; determining whether a consonant frequency range of the input voice falls within the noise frequency range; if yes, adjusting the consonant frequency of the input voice to avoid the noise frequency range to form a modified voice; and playing an output voice, wherein the output voice includes the modified voice.

The sound playing device in the present invention includes a voice acquisition module, a noise detector, a noise analysis module, a voice processing module and a speaker module. The voice acquisition module is used for obtaining an input voice. The noise detector is electrically connected to the voice acquisition module for detecting an ambient noise. The noise analysis module is electrically connected to the noise detector for analyzing the noise frequency range of ambient noise. The voice processing module is electrically connected to the noise analysis module for determining whether a consonant frequency range of the input voice falls within the noise frequency range; if yes, adjusting the consonant frequency of the input voice to avoid the noise frequency range to form a modified voice. The speaker module is electrically connected to the voice processing module for playing an output voice, wherein the output voice includes the modified voice.

DETAILED DESCRIPTION OF THE PREFERRED EMBODIMENT

Hereafter, the technical content of the present invention will be better understood with reference to preferred embodiments.

Figure 1:
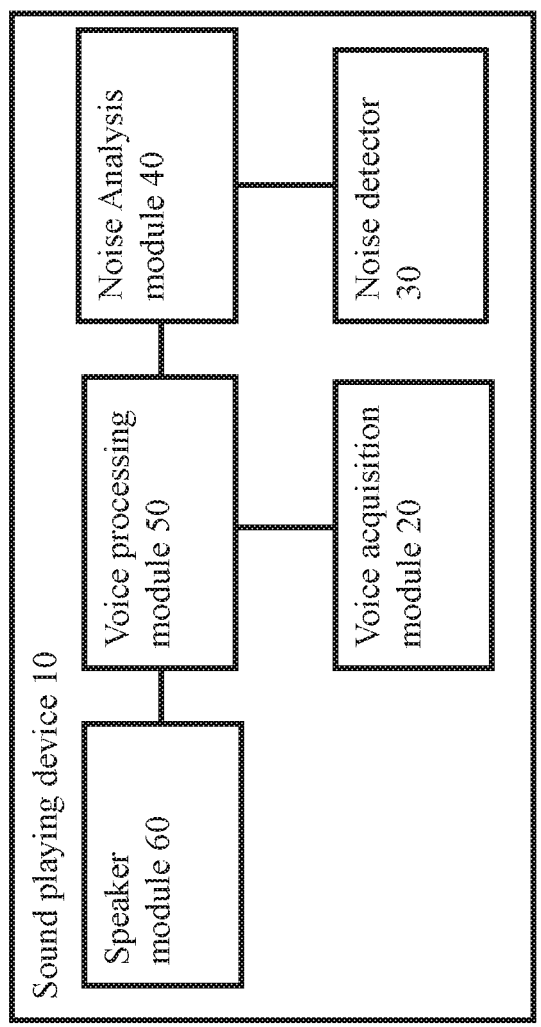
FIG. 1 is an architecture diagram of a sound playing device of the present invention.

Hereafter, please first refer to FIG. 1 for an architecture diagram of a sound playing device of the present invention.

A sound playing device 10 in the present invention includes a voice acquisition module 20, a noise detector 30, a voice processing module 50 and a speaker module 60. The voice acquisition module 20 is used for Obtaining an input voice. In different embodiments of the present invention, the voice acquisition module 20 may be a microphone or other sound receiving device to receive external voices. Also, the voice acquisition module 20 may be a memory module to provide stored voice. The voice acquisition module 20 can even be a text-to-speech (TSS) service module for playing text content, but the present invention does not limit the voice providing method or the path of the voice acquisition module 20.

The noise detector 30 may be a microphone, which is electrically connected to the voice acquisition module 20 for detecting ambient noise outside the sound playing device 10. The noise analysis module 40 is electrically connected to the noise detector 30 for analyzing a noise frequency range of the ambient noise obtained by the noise detector 30. The voice processing module 50 is electrically connected to the noise analysis module 40 to determine whether a consonant frequency range of the input voice falls within the noise frequency range. When falling within the noise frequency range, the voice processing module 50 can adjust the consonant frequency range of the input voice to avoid the noise frequency range to form a modified voice.

In an embodiment of the present invention, Mandarin phonetic symbols (Bopomofo) are used for illustration. As to the phonetic symbols, the vowels are "ㄧ, ㄨ, ㄩ, ㄚ, ㄛ, ㄜ, ㄝ, ㄞ, ㄟ, ㄠ, ㄡ, ㄢ, ㄣ, ㄤ, ㄥ, ㄦ," and the consonants are "ㄅ, ㄆ, ㄇ, ㄈ, ㄉ, ㄊ, ㄋ, ㄌ, ㄍ, ㄎ, ㄏ, ㄐ, ㄑ, ㄒ, ㄓ, ㄔ, ㄕ, ㄖ, ㄗ, ㄘ, ㄙ." Therefore, the voice processing module 50 first identifies the consonants and vowels in the input voice, and analyzes the individual frequency distribution between the consonants and the vowels. For example, when a "ㄙㄠ" sound is issued, the first syllable is "ㄙ" and the second syllable is "ㄠ". The voice processing module 50 then adjusts the consonant. There are many methods for processing the sound frequency, generally frequency compressing or frequency shifting. The method of compressing frequency is to compress the sound of a certain frequency range to another smaller frequency range. For example, if the sound with the original frequency of 0-6000 Hz, is compressed to 0-3000 Hz, the original frequency of 3000 Hz will be changed to 1500 Hz. Frequency shifting is to move the sound of a certain frequency range to another frequency range. For example, the sound with the original frequency of 3000-9000 Hz is shifted down by 3000 Hz to become 0-6000 Hz. Frequency shifting or frequency compressing is a well-known method, and thus they are not described in detail herein. It should be noted that the frequency adjusting method in the present invention is not limited thereto, and other methods may be used as long as similar effects can be achieved.

If the noise analysis module 40 analyzes that the noise frequency range is a high frequency noise, e.g. 8000 Hz or more, the voice processing module 50 adjusts the input frequency range of the input voice to form an intermediate or low frequency modified voice. If the noise analysis module 40 analyzes that the noise frequency range is a low frequency noise, e.g. less than 6000 Hz, the voice processing module 50 adjusts the input frequency range of the input voice to form an intermediate or high frequency modified voice. If the noise analysis module 40 analyzes that the noise frequency range is an intermediate frequency noise, for example, between 6000 and 8000 Hz, the voice processing module 50 adjusts the consonant frequency range of the input voice to form a high frequency or low frequency modified voice. Also, the present invention is not limited to only one noise frequency range of the ambient noise, that is, the ambient noise may be distributed at different frequencies, and the voice processing module 50 adjusts the frequency of the input voice to a "clean" range, i.e. the frequency that will not be disturbed by ambient noise. The modified voice is adjusted to be no more than 12000 Hz and no less than 3000 Hz, but the present invention is not limited to the values.

In another embodiment of the present invention, the voice processing module 50 adjusts the consonant frequency range in the input voice toward a frequency region where the change is small, that is, after the consonant frequency range is adjusted, the frequency difference between the modified voice and the input voice is minimized. In addition, the voice processing module 50 does not process the vowel in the input voice to avoid complete distortion of the input voice.

Finally, the speaker module 60 is electrically connected to the voice processing module 50 for playing the output voice. The speaker module 60 may be a headset or a speaker, but the present invention is not limited thereto. The output voice can include the modified voice, or include both the modified voice and input voice. In this way, when used, the output voice played by the speaker module 60 can avoid the interference of external noise.

It should be noted that each module in the sound playing device 10 may be configured as a hardware device, software program in combination with hardware device, or firmware in combination with hardware device, but the present invention is not limited the manner described above. Additionally, the preferred embodiment of the present invention described here is only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

Figure 2:
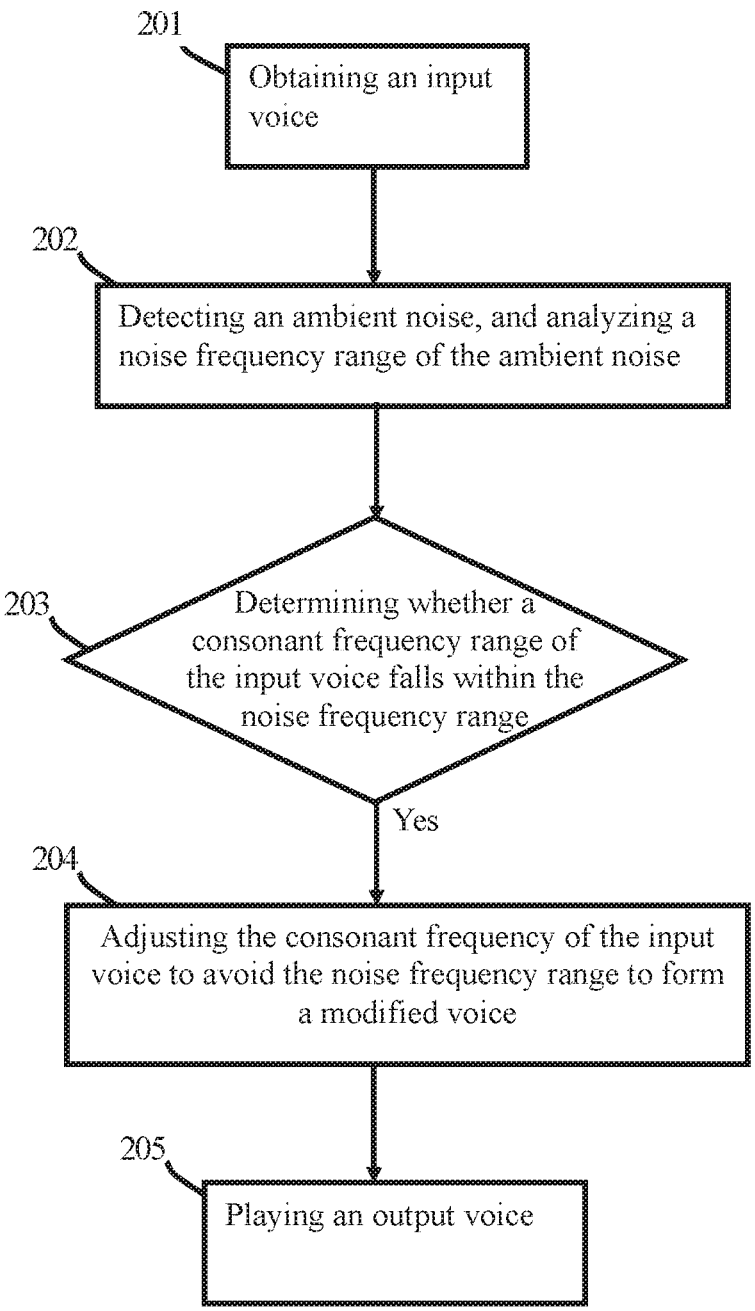
FIG. 2 is a flowchart shoeing steps in a method for detecting ambient noise to change the playing voice frequency of the present invention.

Then, please refer to FIG. 2 which is a flowchart showing steps in a method for detecting ambient noise to change the playing voice frequency of the present invention. It should be noted that although the above-described sound playing device 10 is used as an example for illustrating the method for detecting ambient noise to change the playing voice frequency in the present invention, the method in the present invention is not limited to the use of the sound playing device 10 with the same structure described above.

First, the sound playing device 10 performs Step 201: Obtaining an input voice.

The voice acquisition module 20 is used for obtaining an input voice. The input voice may be voice generated by external voice, the stored voice or text-to-speech (TTS) service module, but the present invention is not limited thereto.

Next, in Step 202: Detecting an ambient noise, and analyzing a noise frequency range of the ambient noise.

The noise detector 30 detects the ambient noise outside the sound playing device 10, and uses the noise analysis module 40 to analyze one of the noise frequency ranges of the ambient noise obtained by the noise detector 30. The noise analysis module 40 can divide the ambient noise into the high frequency noise, the medium frequency noise or low frequency noise, wherein the high frequency noise is above 8000 Hz, the low frequency noise is below 6000 Hz, and the intermediate frequency noise is 6000-8000 Hz, but the present invention is not limited to the way to divide them.

Then, the voice processing module 50 performs Step 203: Determining whether a consonant frequency range of the input voice falls within the noise frequency range.

The voice processing module 50 is electrically connected to the noise analysis module 40 to determine whether a consonant frequency range of the input voice falls within the noise frequency range.

When falling within the noise frequency range, the voice processing module 50 may perform Step 204: Adjusting the consonant frequency range of the input voice to avoid the noise frequency range to form a modified voice.

Figure 3A:
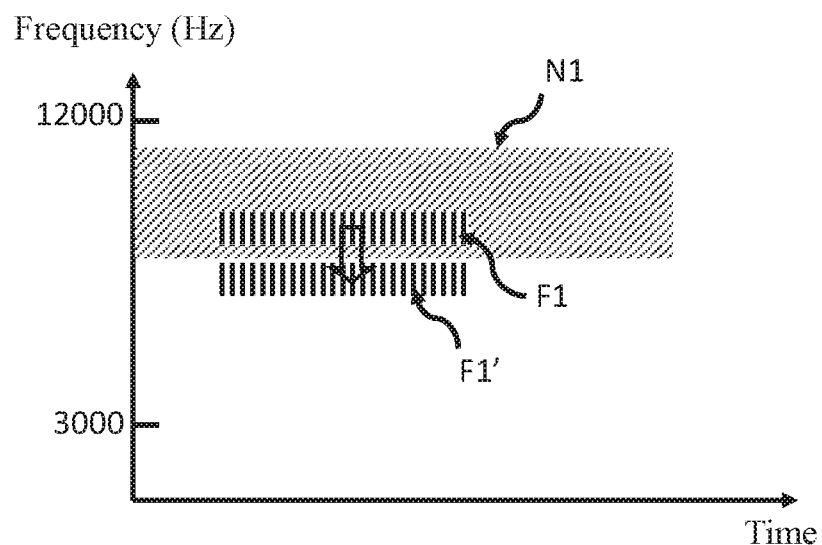
FIGS. 3A-3C are schematic diagrams showing the relationship between the noise frequency range and the consonant frequency range of the present invention.
Figure 3B:
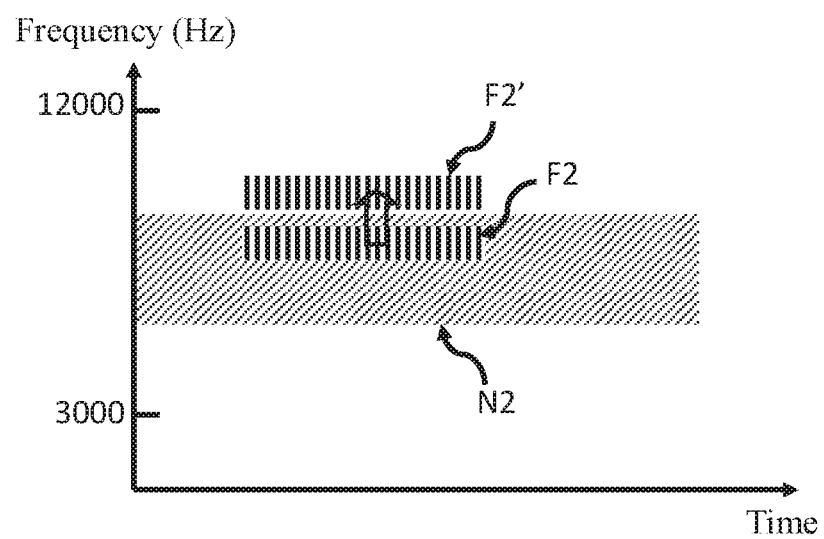
Figure 3C:
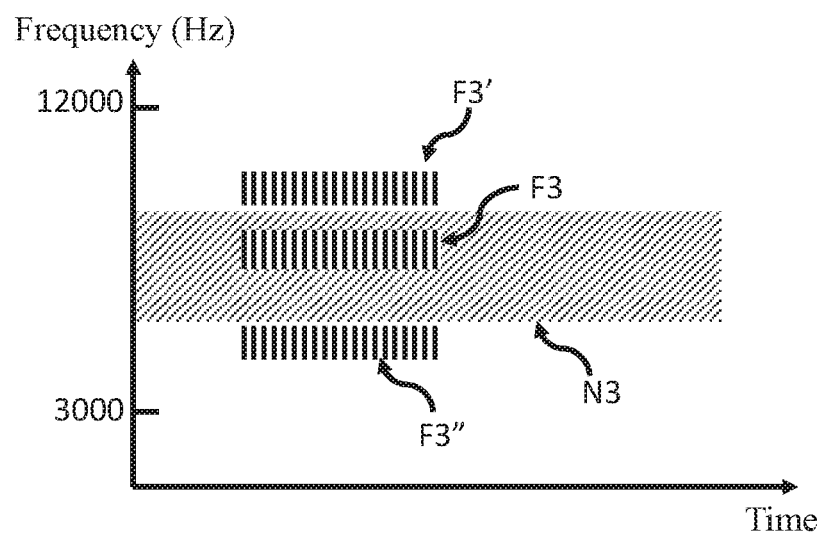

Then, please also refer to FIGS. 3A-3C about schematic diagrams showing the relationship between the noise frequency range and consonant frequency range of the present invention.

The voice processing module 50 adjusts the consonant frequency of the input voice to avoid the noise frequency range, thereby forming a modified voice. The modified voice is adjusted to be no more than 12000 Hz and no less than 3000 Hz. Also, the voice processing module 50 does not process the vowel in the input voice. Therefore, as shown in FIG. 3A, when the noise analysis module 40 analyzes that the noise frequency range N1 is a high frequency noise, the consonant frequency range F1 that falls within the noise frequency range N1 in the input voice can be down-sampling through the voice processing module 50 to form a new modified consonant frequency range F1'. The modified consonant frequency range F1' does not overlap with the noise frequency range N1, so the modified voice can avoid the interference of the noise frequency range N1.

In addition, when the noise analysis module 40 analyzes that the noise frequency range N1 is a low frequency noise, the voice processing module 50 also adjusts the low frequency consonant frequency range F1 in the input voice and use up-sampling or frequency-shifting to avoid the low frequency noise frequency range N1.

Then, as shown in FIG. 3B, when the noise analysis module 40 analyzes that the noise frequency range N2 is an intermediate frequency noise, the voice processing module 50 adjusts the consonant frequency range F2 that falls within the noise frequency range N2 in the input voice, for example, performs frequency shifting to form the modified voice. Moreover, the voice processing module 50 adjusts the consonant frequency range F2 of the input voice toward a frequency region where the change is small, such that the frequency difference between the modified voice and the input voice is minimized. Taking the embodiment in FIG. 3B as an example, the consonant frequency range F2 can be up-sampling or down-sampling to avoid the noise frequency range N2. However, when the consonant frequency range F2 is closer to the high frequency region of the noise frequency range N2, the consonant frequency range F2 is up-sampling through the voice processing module 50, instead of down-sampling, to obtain the modified consonant frequency range F2'. As a result, the frequency difference between the consonant frequency range F2 and the modified consonant frequency range F2' can be reduced.

Finally, in Step 209: Playing an output voice.

The speaker module 60 plays the output voice. The output voice can include the modified voice. As shown in FIG. 3A or FIG. 3B, the speaker module 60 plays such that the output voice can avoid the noise interference. Alternatively, as shown in FIG. 3C, the output voice played by the speaker module 60 can also include both the input voice and modified voice. Taking the embodiment in FIG. 3C as an example, the consonant frequency range F3 that falls within the noise frequency range N3 can be up-sampling or down-sampling through the voice processing module 50 to avoid the noise frequency range N3 to form a higher frequency modified consonant frequency range F3' and a lower frequency modified consonant frequency range F3". At this time, the consonant frequency range F3, the modified consonant frequency range F3', and the modified consonant frequency range F3" may exist at the same time. Alternatively, the modified consonant frequency range F3' with a small frequency difference may be selected according to the consonant frequency range F3. Thus, the output voice played by the speaker module 60 can include both the input voice and modified voice. That is, up to three consonants of different frequencies can exist at the same time, or two consonants of different frequencies exist at the same time.

It should be noted here that the method for detecting ambient noise to change the playing voice frequency in the present invention is not limited to the order of the above steps. The order of the above steps may be changed as long as the objectives of the present invention can be achieved.

In this way, according to the above embodiment, when the sound playing device 10 is used, the continuous interference of the ambient noise can be avoided.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A method for detecting ambient noise to change the playing voice frequency, used for a sound playing device, the method comprising the following steps:
obtaining an input voice;
detecting an ambient noise, and analyzing a noise frequency range of the ambient noise, wherein the noise frequency range comprises a high noise frequency range, a low noise frequency range, and an intermediate noise frequency range;
determining whether a consonant frequency range of the input voice falls within the noise frequency range within at least one of the high noise frequency range, the low noise frequency range, and the intermediate noise frequency range;
if yes, adjusting the consonant frequency range of the input voice toward a frequency region where the change is small to avoid the noise frequency range to form a modified voice, such that a frequency difference between the modified voice and the input voice is minimized; wherein when the consonant frequency range falls within the high noise frequency range, the consonant frequency range is shifted to form a low frequency modified voice or an intermediate frequency modified voice; when the consonant frequency range falls within the low noise frequency range, the consonant frequency range is shifted to form a high frequency modified voice or the intermediate frequency modified voice; when the consonant frequency range falls within the intermediate noise frequency range, the consonant frequency range is shifted to form the high frequency modified voice or the low frequency modified voice; and
playing an output voice, wherein the output voice includes the modified voice.

2. The method for detecting ambient noise to change the playing voice frequency as claimed claim 1, wherein the output voice further includes the input voice.

3. The method for detecting ambient noise to change the playing voice frequency as claimed claim 1, wherein the modified voice is no more than 12000 Hz and no less than 3000 Hz.

4. The method for detecting ambient noise to change the playing voice frequency as claimed in claim 1, wherein a vowel frequency of the input voice is not adjusted.

5. A sound playing device, comprising:
a voice acquisition module, which is used for obtaining an input voice;
a noise detector, which is electrically connected to the voice acquisition module for detecting an ambient noise;
a noise analysis module, which is electrically connected to the noise detector for analyzing a noise frequency range of the ambient noise, wherein the noise frequency range comprises a high noise frequency range, a low noise frequency range, and an intermediate noise frequency range;
a voice processing module, which is electrically connected to the noise analysis module for determining whether a consonant frequency range of the input voice falls within the noise frequency range within at least one of the high noise frequency range, the low noise frequency range, and the intermediate noise frequency range; if yes, adjusting the consonant frequency range of the input voice toward a frequency region where the change is small to avoid the noise frequency range to form a modified voice, such that a frequency difference between the modified voice and the input voice is minimized; wherein when the consonant frequency range falls within the high noise frequency range, the consonant frequency range is shifted to form a low frequency modified voice or an intermediate frequency modified voice by the voice processing module; when the consonant frequency range falls within the low noise frequency range, the consonant frequency range is shifted to form a high frequency modified voice or the intermediate frequency modified voice by the voice processing module; when the consonant frequency range falls within the intermediate noise frequency range, the consonant frequency range is shifted to form the high frequency modified voice or the low frequency modified voice by the voice processing module; and a speaker module, which is electrically connected to the voice processing module for playing an output voice, wherein the output voice includes the modified voice.

6. The sound playing device as claimed claim 5, wherein the output voice further includes the input voice.

7. The sound playing device as claimed claim 5, wherein the modified voice is adjusted to be no more than 12000 Hz and no less than 3000 Hz.

8. The sound playing device as claimed in claim 5, wherein the voice processing module does not adjust a vowel frequency of the input voice.

* * * * *